(12) United States Patent
Torbjørnsen (10) Patent No.: US 8,949,247 B2
(45) Date of Patent: Feb. 3, 2015

(54) METHOD FOR DYNAMIC UPDATING OF AN INDEX, AND A SEARCH ENGINE IMPLEMENTING THE SAME

(75) Inventor: Øystein Torbjørnsen, Trondheim (NO)

(73) Assignee: Microsoft International Holdings B.V., Amsterdam (NL)

( * ) Notice: Subject to any disclaimer, the term of this patent is extended or adjusted under 35 U.S.C. 154(b) by 694 days.

(21) Appl. No.: 12/338,761

(22) Filed: Dec. 18, 2008

(65) Prior Publication Data
US 2009/0164437 A1    Jun. 25, 2009

(30) Foreign Application Priority Data
Dec. 20, 2007    (NO) .................................. 20076596

(51) Int. Cl.
*G06F 7/00*     (2006.01)
*G06F 17/30*    (2006.01)
(52) U.S. Cl.
CPC ............................. *G06F 17/30622* (2013.01)
USPC ...................................................... 707/742
(58) Field of Classification Search
USPC ......................................... 707/742, 754, 715
See application file for complete search history.

(56) References Cited

U.S. PATENT DOCUMENTS

| | | | | |
|---|---|---|---|---|
| 6,067,541 A | * | 5/2000 | Raju et al. ............................... | 1/1 |
| 6,349,308 B1 | * | 2/2002 | Whang et al. ........................... | 1/1 |
| 7,051,017 B2 | * | 5/2006 | Marchisio ...................... | 707/713 |
| 7,720,860 B2 | * | 5/2010 | Hornkvist ..................... | 707/769 |
| 7,730,070 B2 | * | 6/2010 | Hoernkvist ................... | 707/741 |
| 7,765,213 B2 | * | 7/2010 | Loofbourrow et al. ....... | 707/741 |
| 2002/0194151 A1 | | 12/2002 | Fenton et al. | |
| 2003/0229626 A1 | | 12/2003 | Nayak ............................... | 707/3 |
| 2004/0205044 A1 | | 10/2004 | Su ..................................... | 707/2 |
| 2004/0205244 A1 | * | 10/2004 | Marsico et al. ............... | 709/245 |
| 2005/0021512 A1 | | 1/2005 | Koenig ............................. | 707/3 |
| 2005/0144159 A1 | * | 6/2005 | Baader et al. ..................... | 707/3 |

(Continued)

FOREIGN PATENT DOCUMENTS

WO    WO 2009/082235 A1    7/2009

OTHER PUBLICATIONS

Clarke et al., "Dynamic Inverted Indexes for a Distributed Full-Text Retrieval System" Feb. 24, 1995, 9 pages.

(Continued)

*Primary Examiner* — Christyann Pulliam
*Assistant Examiner* — Mellissa M Ohba
(74) *Attorney, Agent, or Firm* — Tom Wong; Jim Ross; Micky Minhas (57) ABSTRACT

In a method for a dynamic updating of an index of a search engine, wherein the index is an inverted index comprising a dictionary, a posting file with a posting list for each keyword of the index and a database log, the documents are inserted in the index in small batches called update generations, a list of all occurrences of keywords in the documents of each update generation is generated, the occurrence list is inserted in the database log, and for each keyword entered in the database a reference to a previous entry of the same keyword is created. This previous entry has a reference stored in the mass storage device as the last added entry of all recently keywords.—A search engine performing the method may be implemented on one or more servers with a mass storage device, and comprises a core search engine with a search subsystem and an indexing subsystem for creating a keyword index stored on the mass storage device and with the index realized as a dynamically updateable index.

14 Claims, 3 Drawing Sheets

(56) References Cited

U.S. PATENT DOCUMENTS

| | | | |
|---|---|---|---|
| 2005/0144160 A1* | 6/2005 | Doerre et al. | 707/3 |
| 2006/0259482 A1* | 11/2006 | Altevogt et al. | 707/5 |
| 2006/0294086 A1 | 12/2006 | Rose | 707/3 |
| 2007/0078890 A1* | 4/2007 | Hsu et al. | 707/103 R |
| 2008/0306949 A1* | 12/2008 | Hoernkvist et al. | 707/7 |
| 2008/0306978 A1* | 12/2008 | Hoernkvist | 707/101 |
| 2008/0307013 A1* | 12/2008 | Loofbourrow et al. | 707/203 |

OTHER PUBLICATIONS

International Search Report & Written Opinion, PCT/NO2008/000445, mailed Apr. 8, 2009, 12 pages.

Lim et al., "Dynamic Maintenance of Web Indexes Using Landmarks" May 20-24, 2003, 10 pages.

Tomasic et al., "Incremental Updates of Inverted Lists for Text Document Retrieval" © 1994, 12 pages.

Brown et al.; Fast Incremental Indexing for Full Text Information Retrieval, Sep. 12-15, 1994, 13 pages.

Cutting et al.; "Optimizations for Dynamic Inverted Index Maintenance" copyright 1989, 10 pages.

Lester et al.; "In-Place versus Re-Build versus Re-Merge Index Maintenance Strategies for Text Retrieval Systems" copyright 2004, 9 pages.

Overmars et al.; "Some Principles for Dynamizing Decomposable Searching Problems" Jan. 1980, 15 pages.

* cited by examiner

METHOD FOR DYNAMIC UPDATING OF AN INDEX, AND A SEARCH ENGINE IMPLEMENTING THE SAME

This patent application claims priority to Norwegian Patent Application No. 20076596 entitled "A METHOD FOR DYNAMIC UPDATING OF AN INDEX, AND A SEARCH ENGINE IMPLEMENTING THE SAME" filed on Dec. 20, 2007, the disclosure of which is incorporated herein by reference.

INTRODUCTION

The present invention concerns a method for dynamic updating of an index of a search engine, wherein the search engine is implemented on one or more servers comprising a mass storage device, and wherein the index is an inverted index comprising a dictionary, a posting file with posting lists for each keyword of the index and a database log.

The present invention particularly discloses a new dynamic free-text search index structure and the dynamic updating thereof. The goal is to maintain the same query efficiency of current state-of-the art solutions, while ensuring short and predictable update latency and maximum consistency.

The typical data structure used for free-text search in large volumes of text is inverted indexes. An inverted index is stored in a mass storage and is accessed therefrom. Presently an inverted index uses a disk-based access method and consists primarily of a lexicon and a posting file stored on and accessed from a disk-based storage. The lexicon lists all words available in the index and for each word it stores the location and size of the word in the posting file. In the posting file there is a sorted list of all places (document identification and position in document) where the word occurs.

Unfortunately, the basic inverted index is static and cannot be incrementally updated as documents are added, deleted or modified. To handle this dynamic behaviour a typical implementation is using partitioning and merging, but with several disadvantages. In the worst case one will have a 100% disk space overhead to handle rebuild of the largest partition. The second problem is the highly varying load on the disk. During merging of the largest partition it will have to read and write the full volume of the index causing lookup in the index to suffer a disk overload. At other times the index update load is minor. The third problem is the cost of switching partitions. When a new partition is introduced, all the cache content is discarded and caches need to be reloaded causing a deep temporary performance drop. The last problem is the need to look up in multiple partitions causing potentially multiple disk operations when there could have been only one.

PRIOR ART

Several projects have tried to overcome these problems, as evinced by the prior art publications listed below:

Doug Cutting and Jan Pedersen, "Optimizations for dynamic inverted index maintenance", "Proceedings of the 13th International ACM SIGIR Conference on Research and Development in Information Retrieval", pp. 405-411, 1990;

Anthony Tomasic, Hector Garcia-Molina and Kurt A. Shoens, "Incremental Updates of Inverted Lists for Text Document Retrieval", SIGMOD Conference 1994, pp. 289-300;

Marc Overmars and Jan van Leeuwen, "Some principles for dynamizing decomposable searching problems", Report RUU-CS-80-1, Rijksuniversiteit Utrecht, 1980;

Nicholas Lester, Justin Zobel and Hugh E. Williams, "In-place versus re-build versus re-merge: index maintenance strategies for text retrieval systems", CRPIT '26: Proceedings of the 27th conference on Australasian computer science, 2004, pp. 15-23;

Brown, E. W., Callan, J. P. and Croft, W. B., "Fast incremental indexing for full-text information retrieval", Proceedings of the 20th International Conference on Very Large Databases (VLDB)", September 1994, Santiago, Chile;

C. Clarke and G. Cormack, Dynamic Inverted Indexes for a Distributed Full-Text Retrieval System, Technical Report MT-95-01, Department of Computer Science, University of Waterloo, February 1995;

L. Lim, M. Wang, S. Padmanabhan, J. Vitter and R. Agarwal, "Dynamic maintenance of web indexes using landmarks", Proceedings of the Twelfth International World Wide Web Conference, Budapest, Hungary, May 2003.

However, none of these publications addresses three important issues.

Firstly, they do not handle the case of crash recovery and consistency. It is trivial to recover from a crash using the partition and merge approach (just throw away the partition being built and start over again). On the other hand, when doing incremental updates in the index structure, it is important that a crash does not corrupt the data structures.

The second issue is the case of fast real-time indexing and access. Most of the proposed structures do not have a short and predictable latency from the time when a document is received for indexing until it is searchable.

The third unique issue is multiversioning, which is the ability to run a query on a specified version of the index concurrently with other queries running against other versions. This is used to ensure a consistent query over multiple distributed index partitions or a consistent sequence of queries against the same index (e.g. refining a result).

OBJECTS AND SUMMARY OF THE INVENTION

Hence an object of the present invention is to provide a method for dynamically updating an index for a search engine, such that indexing can take place in approximately real time and with a high-frequent stepwise or semi-continuous update.

Another object of the present invention is to maintain a high search query processing efficiency combined with short update latency and maximum consistency.

The above objects as well as further features and advantages are realized with a method according to the present invention, which is characterized by steps for inserting documents in the index in small batches, each batch constituting an update generation of the index; generating a list of all occurrences of keywords in the documents of each update generation; inserting the occurrence list in the database log; and creating for each keyword entered in the database a reference to a previous entry of the same keyword in the database log, said previous entry having a reference stored in the mass storage device as the last added entry of all recently added keywords.

Some additional features and advantages are mentioned below.

The invention keeps the lexicon and posting file from the inverted list index, but introduces four new concepts: log file, generations, delta lists and checkpoints. A log file is a file that is written sequentially but can be read randomly. After a while the beginning of the file can be truncated. This is similar to a database log file. A generation is a batch of updates to the index (insert/delete/update document). Generations are sequential and non-overlapping, i.e. there is a strict order of the generations. A delta list is the incremental postings in the postings file for a word for a given generation. A checkpoint is the process of collecting delta lists from the log file and writing them to the postings file.

Advantageously the following operations are supported by the method according to the present invention.

Adding Generation

When a generation is added, sorted delta lists are created for all words in the generation with the address of the previous delta list of that word in the log file, and the data lists are written sequentially at the end of the log. Once it has been ensured that the log file has been written to disk one can start serving searches on that generation. The address of all words that so far has not yet been checkpointed is kept in a main memory.

Looking Up a Word for a Given Generation

First read the word from the lexicon. In the lexicon the address of the main posting plus the address of the checkpointed delta lists are found. With the pointer in address in main memory also the delta lists that have not yet been checkpointed are read (following the chain of backward references). The delta lists newer than the generation in which the lookup is run, are also discarded. Then the sorted delta lists are merged together with the main postings and an occurrence list which is sorted on document id is produced.

Running Checkpoint

A checkpoint is run to cover all generations since the previous checkpoint started and until it starts itself. To optimize lookup the delta lists for a word are either stored together with the main postings or sequentially at another location in the postings file.

Running Garbage Collection

For performance reasons all generations since the creation of the index should not be kept. A large number of delta lists implies a significant overhead for each lookup. First it is necessary to define a generation that sets a limit on the age of generations which can be queried specifically. Then delta lists older than this generation are merged together into a single posting in the posting file keeping the newer delta lists. Alternatively generations based on coarser time granularities (e.g. day, month, or year) can be grouped together. In addition there must be a free space management in the postings file for reuse of space from postings and delta lists being moved. Garbage collection is done as part of checkpoints. It is not necessary to garbage collect all words as part of a checkpoint as it can be distributed over time.

Recovery

After a crash (software or hardware) it is necessary to bring the data structures in the lexicon and the postings file into a consistent state without loosing any document updates. This is done by reading the log file from the start of the last completed checkpoint and redoing updates to the files and main memory structures.

Obviously and preferably both the main posting and the delta lists can be compressed to save disk space and bandwidth.

Also, additional features and advantages of the present invention shall be apparent from the appended dependent claims.

The present invention shall be better understood by reading a detailed discussion thereof in conjunction with the appended drawing figures, of which

Figure 1:
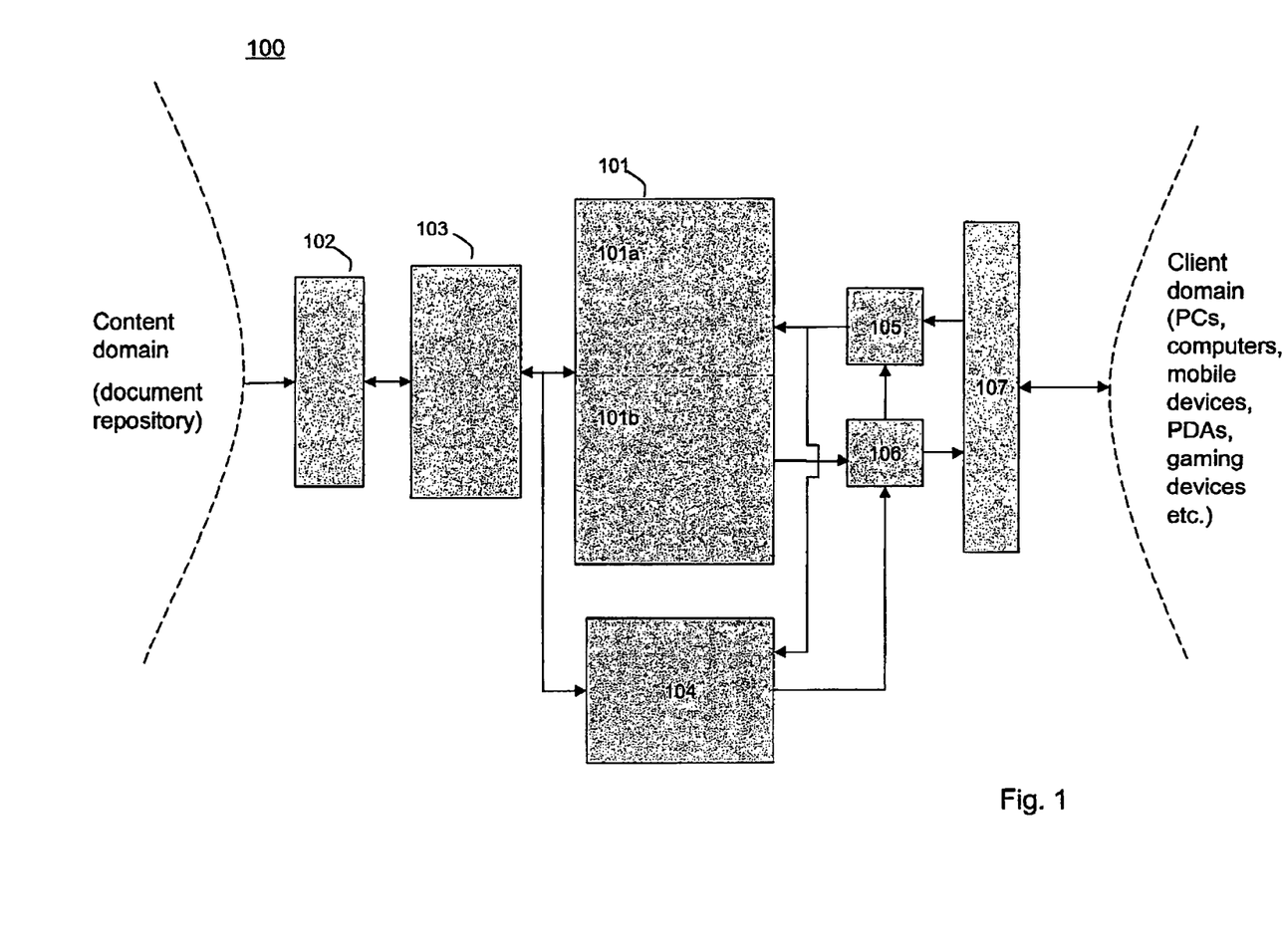
FIG. 1 shows schematically the architecture of a search engine on which the method according to the present invention can be implemented, FIG. 2 an example of the concept of an update generation (or just generation for short)

The special part of the description followed below has been divided into Sections 1-8 of which Section 1 sets the general background of the present invention into context, Section 2 is a general overview, Sections 3 and 4 are detailed discussions of features, aspects and embodiments of the method according to the present invention, as well as of index structures implemented on a search engine similar to the one shown in FIG. 1, Sections 5 and 6 detail further aspects of the invention including its advantages, the possibility of a generic updateable index and certain circumstances and aspects that must be taken care of when implementing the method according to the invention, while Section 7 sketches some potential improvements to the method of the present invention, although they may be considered as presently lying beyond the scope of the present invention as herein disclosed. —Finally, Section 8 is given to a few concluding remarks.

1 Search Engine Architecture 1.1 The search engine 100 of the present invention shall as known in the art comprise various subsystems 101-107. The search engine can access document or content repositories located in a content domain or space wherefrom content can either actively be pushed into the search engine, or via a data connector be pulled into the search engine. Typical repositories include databases, sources made available via ETL (Extract-Transform-Load) tools such as Informatica, any XML formatted repository, files from file serves, files from web servers, document management systems, content management systems, email systems, communication systems, collaboration systems, and rich media such as audio, images and video. The retrieved documents are submitted to the search engine 100 via a content API (Application Programming Interface) 102. Subsequently, documents are analyzed in a content analysis stage 103, also termed a content pre-processing subsystem, in order to prepare the content for improved search and discovery operations. Typically, the output of this stage is an XML representation of the input document. The output of the content analysis is used to feed the core search engine 101. The core search engine 101 can typically be deployed across a farm of servers in a distributed manner in order to allow for large sets of documents and high query loads to be processed. The core search engine 101 can accept user requests and produce lists of matching documents. The document ordering is usually determined according to a relevance model that measures the likely importance of a given document relative to the query. In addition, the core search engine 101 can produce additional metadata about the result set such as summary information for document attributes. The core search engine 101 in itself comprises further subsystems, namely an indexing subsystem 101a for crawling and indexing content documents and a search subsystem 101b for carrying out search and retrieval proper. Alternatively, the output of the content analysis stage 103 can be fed into an optional alert engine 104. The alert engine 104 will have stored a set of queries and can determine which queries that would have accepted the given document input. A search engine can be accessed from many different clients or applications which typically can be mobile and computer-based client applications. Other clients include PDAs and game devices. These clients, located in a client space or domain will submit requests to a search engine query or client API 107. The search engine 100 will typically possess a further subsystem in the form of a query analysis stage 105 to analyze and refine the query in order to construct a derived query that can extract more meaningful information. Finally, the output from the core search engine 103 is typically further analyzed in another subsystem, namely a result analysis stage 106 in order to produce information or visualizations that are used by the clients. Both stages 105 and 106 are connected between the core search engine 101 and the client API 107, and in case the alert engine 104 is present, it is connected in parallel to the core search engine 101 and between the content analysis stage 103 and the query and result analysis stages 105; 106.

1.2 The indexing subsystem 101a of the search engine indexes documents from the document or the content repository and creates the index of the search engine with keywords essentially in the form of all words from the index documents with the exception of stop words. When processing a search query, the query or search terms is applied to searching the index, finding the keywords of the index matching the search terms and on this basis retrieving the documents forming the result set of the query. The documents of the result set are retrieved from the content repository and as obvious they may not be stored in the search engine memory, but instead on servers, personal computers and so on, that either are located within an enterprise framework or linked to the www. The search engine index itself is stored on mass storage device of the server or servers on which the search engine is implemented, and presently such a mass storage device can be equated with magnetic disk memories. However, in the following the reference usually will be to mass storage devices in the form of disk memories) although it should be understood that the method according to the present invention is by no means limited to indexes stored on disk memories, although the concept disk-based is frequently invoked, but in an exemplifying, not limiting sense.

2 Overview 2.1 Terminology

For this document documents are considered to be the units to be indexed. They are uniquely identified with Document IDentifiers (DID). A document is a sequence of words (or tokens) uniquely identified with Word IDentifiers (WID). Each word has a position in the document. Multiple words can have the same position.

2.2 Generations

All changes to indexed data are associated with a Generation Identifier (GID). A generation is a consistent logical view of the data at a specific point in time. A query will be executed in the consistent view of a single generation and thus the result will be consistent. The generation concept is defined over the fully distributed platform.

At any time multiple generations might be visible. An open generation is a generation that has not been completely built yet and cannot be used for queries. Concurrently there might be more than one open generation.

An active generation is complete and consistent. New queries should be directed to the most recent active generation. When a new generation becomes active the older generations might be removed when there are no queries running against these generations.

Figure 2:
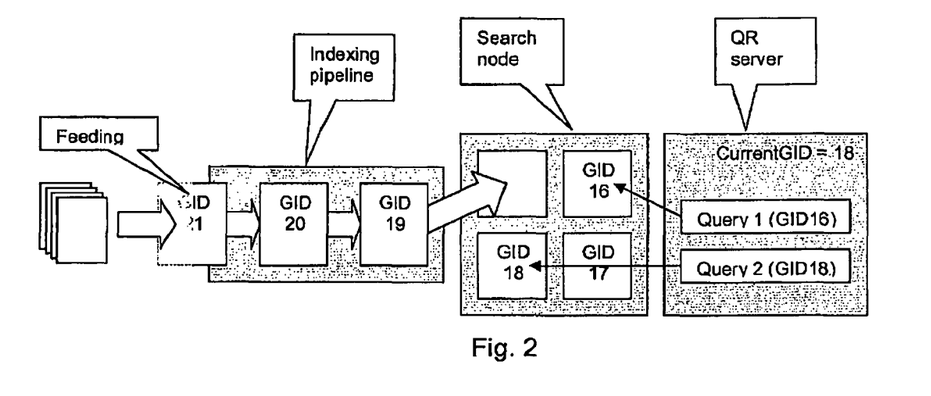

FIG. 2 shows an example of the usage of generations. Generation 21 is currently being built with documents being fed and is obviously open. Generations 19 and 20 are also open but complete and being processed by the feeding and indexing pipeline. Generations 16, 17 and 18 are active at the search node and can be used for querying. Generation 19 is currently being installed from the indexing pipeline but not active.

The QR server keeps the GID of the most recent generation and new queries are labelled with this GID. In FIG. 2 there are two active queries, Query 1 and Query 2. Query 1 is old and runs against an old generation 16. The other query is new and recently submitted and tagged with GID 18. No queries will be issued for generation 19 before it is fully installed and active.

GIDs are enumerated with a 64 bit linearly increasing integer which will be virtually inexhaustible. Operations on documents that change the index (insert, update or delete) are given the GID of the current incomplete open generation when they are being fed.

A new generation is started based on either when the current generation has a maximum number of documents, a maximum aggregated document size or a certain time interval. The best approach is probably a combination thereof. These parameters must be tuned with respect to two performance parameters: indexing latency and indexing throughput. Many small generations means a shorter latency, but probably also a higher overhead in the indexing process. Large generations give a better throughput, but the time it takes to feed a generation delays the time before a generation becomes active and documents visible to searching.

3 Inverted List Index Structures

This section outlines the index structures for an updateable inverted list index with full position information (posocc). This index can also be applied to a boolocc and a phraseocc index without major changes. A similar approach can be used for other index formats, and this will be described below.

The inverted list index maps from a word (or token) to a position list. The position list contains a list of documents where the word occurs and all the position in the documents where the word occurs.

Now the following important features and aspects relating to index updating, namely the disk structures, the main memory structures and the dynamic behaviour shall be discussed.

3.1 Disk Structures

An index on disk consists of a set of files. All these files should have a common header listing the type of file and a version number. The version number is to ensure the ability to do online upgrade.

Figure 3:
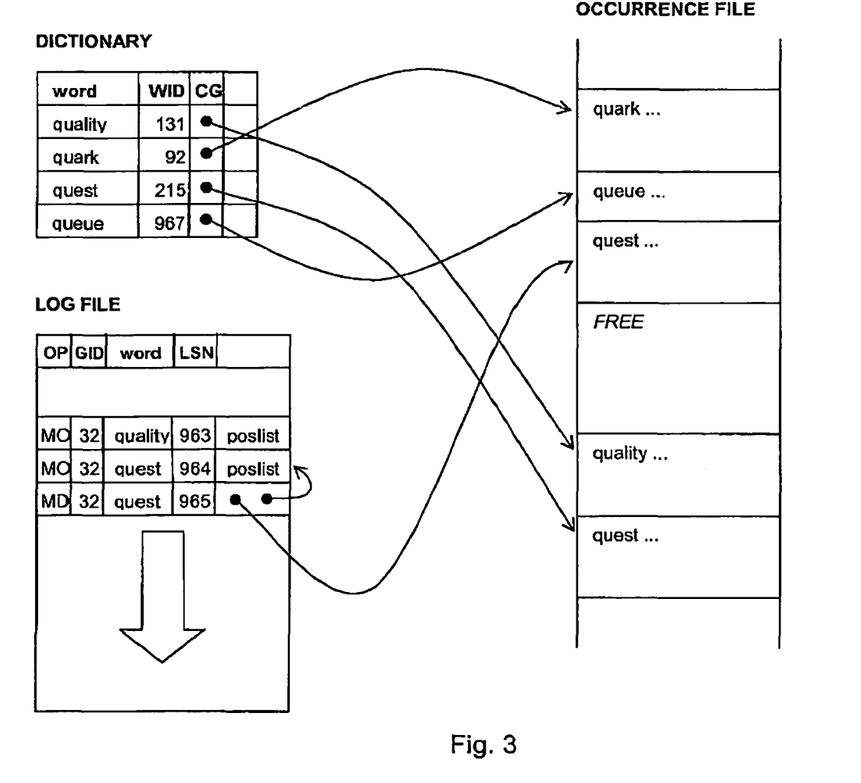
FIG. 3 an inverted list file structure.

FIG. 3 shows a simplified picture of the three files that compose an index, namely the dictionary, the log file and the occurrence file. The index has an inverted list file structure.

3.1.1 Dictionary

The dictionary maps from a word (text) to a word identifier WID and the position list and delta list for the last check-pointed generation CG. For small words (two or less entries in the list) the information can be embedded in the dictionary record itself. For collections with Zipf distribution of words this will cover more than 50% of the words (according to the theory 65%).

Larger position lists are placed in an occurrencefile (see Section 3.1.3). The CG entry contains:

The GID of the generation when the list was written (CGID).

Pointer to the start of the position list in the occurrence file.

Number of documents the word occurs in.

Total number of occurrences.

The size of the entry in bytes (the entry in the file is compressed and cannot be computed from the number of documents and entries).
Pointer to the delta list in the occurrence file.
Maximum size of the delta list.
Current size of the delta list.

The layout of the data in the dictionary is outlined by the following pseudorcode. The dictionary contains a set of DictionaryEntry records. Embedded inside records of this kind there may be records of the types PositionListRef, DeltaPositionListRef, Position and EmbeddedPositionList. The brackets {,} denote "Begin" and "End" respectively. Comments to the code is placed after the double slash // and to the right.

```
class {
    OccFilePtr occPtr;      // where in the OccurrenceFile the poslist
                            is
    Int64 nDocs;            // Number of documents the word occurs in
    Int64 nOccs;            // Number of occurrences of word
    Int64 size;             // Size of entry
} PositionListRef;
class {
    OccFilePtr occPtr;      // where in the OccurrenceFile the delta
                               poslist is
    Int64 size;             // Size of delta entry
    Int64 maxSize;          // Allocated size for the delta entry
} DeltaPositionListRef;
class {
    DocId did;              // document identifier
    int64 pos;              // position in document
    Byte userData[ ];       // scope information etc.
} Position;
class {
    Position pos[2];
} EmbeddedPositionList;
class {
    char word[ ];           // the indexed word
    GID version;            // GID when PositionList was last updated
    enum {poslist, embedded0, embedded1, embedded2} type;
                            // is this an external or embedded entry?
                            //   if it is embedded, how many
    union {
        PositionListRef posListRef; // external position list
        EmbeddedPositionList embeddedPos; // embedded position list
    } altPos;
    DeltaPositionListRef delta; // delta list (changes to the poslist)
} DictionaryEntry;
```

The information in this file must be directly accessible with maximum one disk access. To achieve this one can either:

Organize it as a B+-tree using the word as a key. The records in the leaf level pages will be fairly small and it should be possible get a high fan-out at the rest of the pages. All levels except the leaf-level pages should therefore fit into main-memory even with fairly huge collections. The B+-tree will support concurrent updaters, variable sized records and sorted sequential access (supports postfix wildcards). It will unfortunately only have 60-70% space utilization. If the internal nodes in the B+-tree are annotated with an occurrence count it will be possible to efficiently compute the number of occurrence for ranges. This option requires updates of the whole path down the tree even when only a leaf level entry is modified and will be considerable more costly. Updating the B+-tree requires some logging to disk to ensure consistency and adds to the complexity.

Organize it with linear hashing. Will grow dynamically, retrieve data with a single disk access but no sorted sequential access. It should be possible to have a 90% space utilization.

The following description of the invention assumes a B+-tree.

As described here the WID is probably not needed at all. On the other hand, one might replace the use of word somewhere with WID, especially if the dictionary can be fit in memory.

3.1.2 Log File(s)

The purpose of the log file is to record all changes done to the dictionary (Section 3.1.1) and the occurrence file as they happen. The idea is to write changes here when the changes are committed and later batch up updates to the other files and do the updates in larger chunks which are more optimal with respect to disk usage.

The log file is mostly written and read sequentially and consists of typed records of varying size. All records have the following fields:

LSN (Log Sequence Number): A linearly increasing sequence number enumerating the log record.

GID (Generation ID): Which generation this log record belongs to.

TYPE (Log record type): What type of log record this is.

The following record types are needed (more can be added later):

MO (Modify occurrence file): This log entry modifies a position list in the occurrence file. If the word does not already exist in the dictionary, it is inserted into it. It is assumed that MO log records are idempotent. The log record consists of the following fields:

Word: The word modified by this log record.

LPL (Log record Position List): Has the same format as in the occurrence file (OPL—Occurrence file Position List) and is also ordered on DID. The LPL entries override the OPL entries. For a given word, if the document occurs in both lists, the position list in the LPL replaces the position list part for that document in the OPL. If the LPL contains the document but it is empty it is removed from the OPL. If it is present in the LPL hut not in the OPL, insert it into the OPL.

Prev: Pointer to the previous MO log record on this word in this checkpoint

MD (Modify dictionary): This log entry modifies a dictionary entry. If the entry does not exist in the dictionary it is inserted. The record consists of:

Word: The word identifying the dictionary entry.

MOptr: It also contains a pointer to the last MO log record for this word in this checkpoint.

GC (Generation completed): A generation has completed and can be queried. The record does not contain any additional fields.

CP (Checkpoint): A checkpoint has been finished and all changes belonging to this generation have been written to disk. The record consists of:

Prev: Pointer to previous checkpoint record and its GID.

Some rules:

Log records are written with increasing LSN numbers.

Log records are never modified and written to disk only once. When the log is flushed to disk, the space after the last record up to the next disk page border should be left unused. The next log record should be added to the next disk page. (This will be difficult if memory mapped files are used).

A checkpoint record will not be written to disk before all updates with a GID less or equal to the checkpoint have been written to disk.

When a checkpoint log record has been written, there will never be written any other log records with a GID less or equal to the checkpoint log record GID.

The log records will only be used to redo operations, never undo.

The log record for an operation is always written to disk before the modified data are written to any of the other disk structures.

The log record for an operation is always written to disk before the modified data are used for query processing.

The log file can be organized as a set of memory mapped files. They are written sequentially, one by one. When the last one has been filled up it starts over from the oldest one. The aggregated size of the log files limits the size of one checkpoint (the log files must contain at least two checkpoints). The log size can be changed on-line by adding or deleting log files.

In the beginning of each log file there should be a header listing the most recent checkpoint log record. All checkpoints can be found by following the previous pointer. The checkpoint entry in the header should be identified by a GID and contain the offset in the file. The header should also contain a high-water marker showing how far the log has been written, the LSN of the first log record in the file and a reference to the previous log file.

A common log file index should list the log files currently used, their sizes, their individual sequence and the most recently used log file.

3.1.3 Occurrence File

The occurrence file consists of a set of position and delta lists. A position list gives all the locations of a given word. The position list is a sorted list of documents (sorted by GID). For each document there is a list of positions where the word occurs. With each position there is also an application specific fixed sized occurrence data field (e.g. scope information).

A delta list contains the changes to the position list since it was written. It contains one section for each generation where there have been changes to the position list. Each section consists of the GID and the LPL from the MO log record.

Both the position list and a delta list might be compressed.

The layout of the position list and delta list is outlined by the following pseudocode. PositionList is the record layout of the position list. DocumentInfo contains the information about one document. OccurrenceInfo is the information about every occurrence of the word. DeltaList is the record layout of the delta list. Each entry in the delta list has the record format of DeltaEntry. The brackets {,} denote "Begin" and "End" respectively. Comments to the code is placed after the double slash // and to the right.

```
class {
    VersionId version;      // version of this entry, enables online
                            upgrade
    int32 docCount;         // number of documents
    DocumentInfo docs[ ];
} PositionList;
class {
    DocId did;              // document identifier
    int32 occCount;         // number of occurences in this document
    OccurrenceInfo occs[ ];
} DocumentInfo;
class {
    int64 pos;              // position identifier
    Byte userData[ ];       // scope information etc.
} OccurrenceInfo;
class {
    GenerationId gid;       // Checkpoint when this delta is valid
    DocumentInfo occ;       // occurrence list of this delta
} DeltaEntry;
class {
    Int16 nDeltas;          // number of delta entries in this delta list
    DeltaEntry entry[ ];    // the delta entries
} DeltaList;
```

Note there are no GIDs in the position lists as they are only coded in the dictionary. There might be many position lists for the same word in the occurrence file as they will represent different checkpoints. An old position list cannot be removed from the occurrence file as long as it is searchable. The file must be a certain fraction larger than the data it indexes and this can probably be self-tuneable.

For large occurrence entries they may be split it into smaller sections, each compressed separately (e.g. for each document or each n'th document). A skip list can make it possible to skip sections not matching any other expressions to speed up composite queries.

3.1.3.1 Free Space Management

Figure 4:
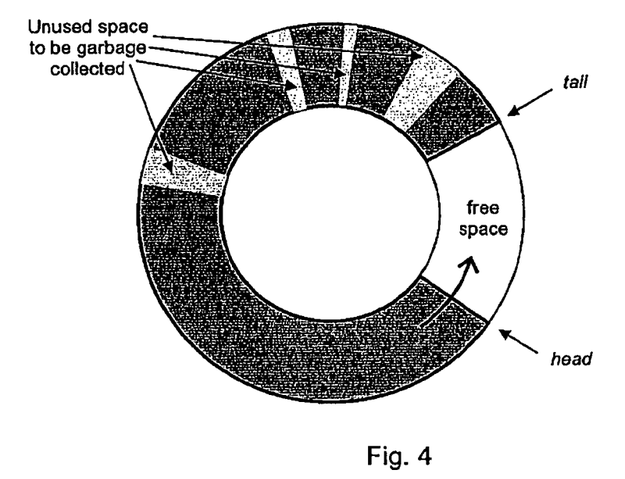
FIG. 4 free space management of the occurrence file.

The occurrence file will grow over time unless the space of old occurrence entries is reused. To do this a circular buffer strategy can be used. This is illustrated in FIG. 4.

The occurrence file should start with a specified fixed size. The end of the file wraps around to the beginning (with the exception of the file header). The occupied part of the file is between two pointers into the file, the tail and the head. All new and updated entries are written at the head where the free space shrinks. On the tail used areas are copied to the head and will be part of the current open generation. Unused space will be released and the free space area will increase. To release space it is necessary to know the oldest generation OG that should be searchable.

The occurrence file alone has no information on which areas are unused or not. This must be extracted from the dictionary and the log. Each time one wants to release space it is necessary to do a sequential scan of the log and dictionary. Each such scan is called a garbage collect scan (GC scan). This can be done by:

1. Await the start of a checkpoint.
2. Scan the dictionary file. Record the n words with a position list closest to the tail and add the dictionary entry to the dictionary cache (if not already there). n should be set to limit main memory consumption but at same time releasing as much space as possible in one scan. Any of these words that are going to be checkpointed in this checkpoint is handled specially.
3. The area from the tail (X) to the most recent of the n words (Y) is a candidate for being freed. Compute the space necessary to move the position and delta lists of these words to the head. Allocate the space and move head.
4. Start from X and copy the n words to the space allocated in 3. Combine generations not searchable any more from the delta list and the log records being checkpointed and merge them into the position list. Create new delta lists with updates from the searchable generations. For all words the delta lists should be written just after the position list. For larger words one should allocate some extra space for growth.
5. Update the entries in the dictionary cache with the new locations of the position and delta lists as one goes. Write new MD log records. This can be done in larger batches and should be quite efficient.
6. Write the new dictionary entries to the dictionary file.
7. Await completion of the checkpoint.
8. Move the tail releasing the space between X and Y.

The algorithm above ensures that a GC scan can last more than one generation.

It is possible to have two or more occurrence files. One file can contain frequently changing words while the other more static ones. This may make it more efficient to garbage collect the position lists.

3.1.3.2 Resizing the Occurrence File

It is possible to increase the size of the occurrence file by just adding space at the end of the file the next time the tail pointer comes to the end of the file. If the space is needed right away it is possible to add it at the end and then set head and tail to point to the start of the new free space and the start of the file respectively.

It is also possible to shrink the occurrence file when the tail reaches the end of the file and wraps around. The file can then be truncated somewhere between the head pointer and the end.

The free space can be automatically adjusted every time the tail reaches the end of the file. Set two threshold values (lower and upper), given either in bytes or percent of the file size. If the space between the head and the tail exceeds the upper value, the file is truncated so the free space is somewhere between the thresholds (e.g. the middle). If it drops below the lower value the file is extended to a value between lower and upper. E.g. lower threshold is 20% and upper is 30%.

3.1.4 Generation Map

Since the generation identifier &ID is an always increasing variable and can change frequently (e.g. once per second) it must be large (at least 32 bits) and leads to a significant space overhead in the index. It is possible to save some of this space using an indirection mechanism. A generation map can map from a short intermediate generation identifier IGID (e.g. 16 bit) to a larger GID (e.g. 64 bit). When all occurrences of an IGID have been removed from the index it can be reused by just modifying the generation map. To do this the log must have rotated once (all log records with the old IGID overwritten) and the dictionary scanned and all words with old IGIDs refreshed with the newest.

3.2 Main Memory Structures

Figure 5:
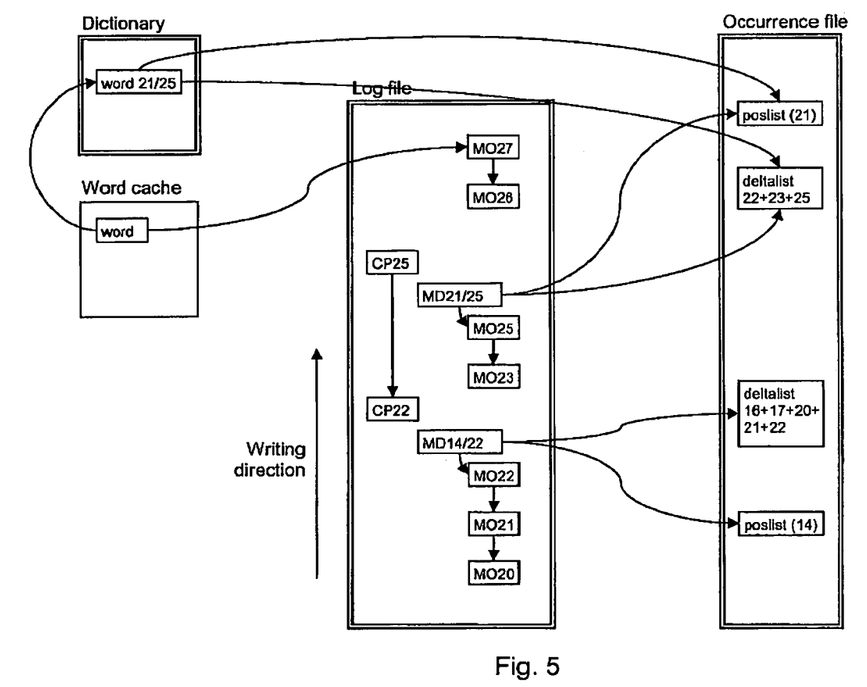
FIG. 5 the main memory and disk-based structures.

The relationship between the disk (mass) storage and main memory structures is shown in FIG. 5. The double-framed boxes are disk-based. The numbers in the boxes are GIDs. Numbers in parenthesis are implicit. The two numbers in the MD log records denote respectively the generation of the position list and the generation when the dictionary entry was changed.

3.2.1 Log Buffer

The log buffer consists of all log files mapped into main memory. The log records can be accessed by logical pointers pointing into the log files. Such a logical pointer consists of a file number and an offset into the file which can be used to compute the physical address.

3.2.2 Dictionary Cache

The dictionary cache caches the entries from the dictionary file. It will reside in the regular heap and have a maximum size parameter (number of entries). Most systems should be able to cache the whole dictionary. Only systems with small main memories or an extremely high number of words should need to access the disk as part of a dictionary lookup.

All access to entries in the dictionary cache must go through the word cache. It must therefore always exist a word cache entry as long as the dictionary cache entry is present.

The replacement strategy might be LRU (Least Recently Used). Each time an entry is accessed it is placed on the end of an LRU chain.

3.2.3 Word Cache

The word cache is a variable sized main memory structure caching information about words in the index. The entries are looked up using the word itself as a key. The cache entry contains two parts:

MOptr: A pointer to the last MO log record for the word and its GID

CkptMOptr: A pointer to the last MO log record for the word and its GID for the current incomplete checkpoint CkptMDptr: A pointer to the last MD log record for the word and its GID for the current incomplete checkpoint DCptr: A reference to the dictionary cache entry (if any)

The cache is organized as an LRU structure with the ability to lock entries in the cache (e.g. using reference counters). The entries are locked as long as the word is part of an incomplete checkpoint (it has a pointer to an MO log record) or if there exists a dictionary cache entry for the word.

The cache must have an entry for each word in the current incomplete checkpoint. Therefore there cannot be an upper limit on the size of the word cache. Instead there should be a preferred size. The cache should be allowed to grow above this if necessary but shrink again as soon as it is not required any more.

3.3 Dynamic Behaviour

3.3.1 Index Update

The index updates come in as log file entries from the indexing pipeline (MO or GC log records). They are assigned an LSN number and copied to the memory mapped file log buffers. When a GC log record has been copied, the log file is flushed to disk. When the log record has been written the log file header is updated with the new high-water mark and written to disk. When the flush is complete the generation is searchable.

When an MO log record has been received and copied to the log the word is entered into the MOptr field in word cache and locked there. If it is already there, check if it points to another log entry for the same word. If the new log entry belongs to the same checkpoint as the previous log record, chain it into the previous list.

3.3.2 Log Tracking

If there are more than one search node that are querying using the same index files (e.g. sharing files over a NAS), only one of them has to update the index. The other ones only need to track the changes. The updater will open the index files as read/write, the trackers only need to open them read-only. An external entity takes the decision on which node is the updater.

A tracking search node tracks the new MO and MD log entries in the log and as they are added he updates the MOptr and the CkptMDptr fields in the word cache. CkptMOptr is not used. If one reads a CP log record the MOptr and the CkptMDptr fields are reset, all entries in the word cache are unlocked and the dictionary cache entries removed for that word to invalidate the entry.

3.3.3 Checkpointing

Only the updater nodes need to update the index files based on the index update log records. This process is called a checkpoint. A checkpoint starts after a specified time interval since last checkpoint or when the volume of the MO log records in the log since the last checkpoint exceeds a certain limit. A checkpoint is performed as follows:

await generation complete copy all MOptr values to CkptMOptr for all values in the word cache. Reset the MOptr.

for each word in the dictionary cache (possibly in parallel)
    read all the MO log records for the word
    read the dictionary entry for the word
    read the delta list for the word from the occurrence file (if any)
    add the log records to the end of the delta list
    if it is space
        write the new delta list to the original location
    if not allocate space at the head of the occurrence file and update the head pointer
write the new delta list to the allocated location
create an MD log record and write it to disk
set CkptMDptr to point to the new MD log record
update the dictionary entry
write the checkpoint log record to the log and flush the log to disk
unlock the word cache entries If the position list fits in the dictionary entry, the position list does not have to be written to the occurrence file. The dictionary entry should not be deleted if the position list becomes empty. (It may be garbage collected later after one cycle through the log files.)

For systems with large main memories the whole dictionary and log will fit in memory. For the rest one needs to optimize the disk access pattern. The following measures are proposed:

Order the words processed during a checkpoint in increasing word order (assuming B+-tree);
process a given number of words in batches (e.g. 1000). Due to the ordering they will be close to each other in the dictionary B+-tree;
use a priority queue to scan through the log in reverse order until all MO log record chains for the batch are exhausted. This will give an almost sequential scan through the log;
write delta lists that must be moved sequentially to a large free space region in the occurrence file. This will result in just a few writes, maybe only one;
write the MD log records in batches;
write the updated dictionary entries to the B+-tree. Due to the proximity there will be fewer writes.

3.3.4 Query Processing

A query comes in with a word and the generation identifier the query runs in (QGID). The following procedure applies:
If the QGID is newer than the latest GC log record written to disk the query should wait until the log record has been written.
If not already there, create a cache entry in the word cache.
If not already cached, read the dictionary entry for the word. It might not exist.
Read the position and delta list from the occurrence file (if any) using the addresses in the dictionary entry. Read the MO log records if necessary (if any). Merge the position list with all updates from generations less than or equal to the QGID. They might be located in the delta list and/or the MO log records. Depending on the QGID it might not be necessary to read the delta list or the log records.

3.3.5 Start-Up and Recovery

When a node starts it reads the headers of all log files and finds the location of the latest checkpoint. From the checkpoint it reads the log sequentially and re-populates the word cache using the MO log records. Any MD log records in the log are just ignored. Generations are recorded as the log is read. Now the node can be opened for new queries.

An updater starts a new checkpoint based on the last GC log record (if it does not already exist). It then registers with the indexing pipeline that it is ready to receive log record entries. It provides the GID of the last GC log record as a starting point. The indexer will potentially resend the log records of an incomplete generation but it does not matter since the log records are idempotent.

3.3.6 Controlled Stop

The updater node will wait until a GC log record is received. It will then stop all new queries and start a checkpoint. When the checkpoint has completed it will terminate the node.

Tracking search nodes can terminate immediately.

4 Performance Evaluation

This section evaluates the potential performance of the new index. We assume a Zipf distribution of words in documents and identical distribution for words in queries. The important parameter is the total number of word occurrences, not the number of documents or words per document.

The number of different words V in a collection of n words is given by Heaps' law:

$$V = K n^\beta \text{ with constants } K,\ 0 < \beta < 1$$

Typical constants are $K \approx 10\text{-}100$ and $\beta \approx 0.4\text{-}0.6$. Here we assume $K=50$ and $\beta=0.5$ (square root).

TABLE 1

Number of unique words in a collection of a given size

| Number of words | Number of different words |
|---|---|
| 10,000,000 | 158,114 |
| 100,000,000 | 500,000 |
| 1,000,000,000 | 1,581,139 |
| 10,000,000,000 | 5,000,000 |

For a large number of words, the 5000 most frequent words are about 90% of the total number of word occurrences. This is fairly independent of the total number of documents. (See Table 2.)

TABLE 2

Fraction of total number of occurrences for the most frequent words

| Number of words | Total number of occurrences |
|---|---|
| 1,000 | 75% |
| 1,700 | 80% |
| 2,800 | 85% |
| 5,000 | 90% |
| 7,500 | 95% |

For the rest of this chapter a stable index with 10,000,000,000 words and an update rate of 10,000,000 words per checkpoint are assumed. With an average 1,000 words per document one will have respectively 10,000,000 and 10,000 documents.

It is assumed that there is no compression.

4.1 Size of the Index Structure

There will be 5,000,000 different words in the dictionary and each entry will be approx 50 bytes. Assuming a space overhead of 100% in the B+ tree the size of the dictionary will be 500 MB.

The log must be large enough to fit all log records after the penultimate checkpoint. Calculating approximate sizes for the log records we end up with less than 200 MB per checksum, i.e. 400 MB. This must fit in main memory.

Use a 5% in-place growth margin for the 5000 largest entries the occurrence file. This will give a static overhead of 4.5%. This will require 50 checkpoints in average before the extra space overflows and the full entry must be written to a new location. It is assumed that the garbage collection in most cases already has rewritten it before this happens. The last 10% of the words will be written sequentially at the head. Some of these words will be updated in multiple generations and have to be written multiple times. It is assumed an overhead of 1% due to these updates.

According to the Zipf distribution, the most frequently occurring word will be 10% of the total volume in the occurrence file. The file must be able to store this word twice leading to an overhead of 10%. Adding another 10% for a safety margin and space for garbage collection we end up with a total overhead of 30%. This margin can be reduced if stop words are removed.

4.2 Main Memory Footprint

For optimal performance the dictionary and the part of the log since the last checkpoint must reside in main memory.

There should be a log for one checkpoint in memory, i.e. 200 MB.

The word cache should probably be able to handle 200,000 entries, i.e. 10 MB.

The dictionary will be 500 MB but a main memory cache version can be done much more compact, say 300 MB.

A working space for the garbage collect process and query processing is needed. The most frequent word will be 10% of the total volume in the occurrence file. This can be copied/processed in smaller chunks so moderately sized buffers should be sufficient (e.g. 10-100 MB per thread).

4.3 Number of Disk Accesses for Index Update

A whole generation can be written with a single sequential write.

4.4 Number of Disk Accesses for a Checkpoint

If it does not fit in memory, read the log since last checkpoint sequentially (200 MB).

If it does not fit in memory, read the dictionary sequentially (500 MB).

Read 158,000 delta lists randomly (the number is probably much lower, this is a worst case number). If one can order the accesses by increasing disk position, this will be half-way sequential. The most frequently occurring words will probably be cached (they will probably also have the largest delta lists).

Write 5,000 delta lists randomly, 153,000 sequentially.
Write 158,000 MD log records sequentially (5 MB).
Write the dictionary sequentially (500 MB).

4.5 Number of Disk Accesses for a Garbage-Collect Scan

If the dictionary does not fit in memory we will have to sequentially read the dictionary.

Sequentially read the area of the disk that is being garbage-collected picking up the position and delta lists that are being moved. Randomly read the delta lists not collocated with their position list. In the worst case a sequential read of the complete occurrence file. Sequentially write the new position and delta lists at the head.

Sequentially write new MD log records. Update the dictionary (in the worst case sequentially rewriting the whole dictionary).

In addition there will be the I/O from the associated checkpoint.

4.6 Number of Disk Accesses for Term Lookup

In most cases it should be possible to retrieve a term with only one sequential disk access. Only in the cases when the word has been changed since the last garbage collect and the position list and the delta list are not collocated it will be necessary with two disk accesses. For the numbers given above one is talking about less than 10% of the cases. The two disk accesses can be done in parallel.

If the dictionary does not fit in memory we will need an additional disk access to read the dictionary entry.

If the log does not fit in memory there might in the worst case be one extra disk access per MO log record. The accesses will be random but will be within a smaller restricted area on the disk (the part of the log file since the last checkpoint started).

4.7 Freshness

A document will be searchable as soon as:

The generation it is a part of is complete. Smaller checkpoints mean shorter latency but more work during the checkpoint.

All the documents in the generation must have been processed by the document processing pipeline and the indexing stages producing the MO log records.

All the words in the generation must have been added to the word cache. This depends on the size of the generation but should in most cases be a few milliseconds CPU time.

All the log records in the generation must have been written to the log. Since this can be done by a single sequential write one is talking about less than one second.

The information about the availability of a new searchable generation must travel to the QR server.

5 Generic Updateable Index

The updateable inverted list index described above can be generalized to most index types. In the generic case the following files are required:

log file(s)
directory
data file

For the inverted list the dictionary is the directory and the occurrence file the data file. The directory represents an indirection step that shall enable the maintenance of multiple versions of the same data. For each indexed element there has to be a pointer into the data file and a generation identifier. The log file will contain the identical log records and checkpointing will be the same.

An attribute vector may be taken as an example. Presently a vector attribute is accessed using the document identifier as a key. All elements have the same size and the position in the file can directly be computed. For an updateable attribute vector the position can be directly computed in the directory instead (all entries in the directory will have the same size). Reading the entry in the directory a pointer to the attribute value in the data file will be found and it is GID. Each time the attribute value is changed a log record is written to the log. At checkpoint time the new value is written to a new location in the data file.

Clearly this approach has several deficiencies compared to a simple direct access implementation:

It will not provide sequential access when scanning documents at increasing order;
always has to go through a level of indirection;
consists of multiple files;
high space redundancy;
it has a complex free space management strategy.

On the other hand, it enables the dynamic update capability and doesn't require the vector elements to have a fixed size.

If there are many attribute vectors, they can share the same directory and this reduces the space overhead.

6. Certain Issues 6.1 Document and Occurrence Count

The dictionary contains the document and occurrence count of a word only for the entries in the position lists. To get the exact numbers for a given generation it is necessary to combine it with info in the delta list. Unfortunately, this will be difficult if a document is deleted or updated (it will be necessary to subtract the old instance).

6.2 Multiple Concurrent Indices

Prior art systems may use many inverted list indices at the same time. For this new updateable index it is also possible to maintain separate dictionary and occurrence files. On the other hand, for best performance one should probably have a single shared log for each partition. The updates coming in to these multiple indices can then be written into the log with a single write saving a lot of disk head movements.

6.3 Updater Node Crashing

If an updater node crashes this must be detected and another node (e.g. a tracking node) must become an updater. It must perform recovery and has to wait for the indexing stream to be directed towards it.

6.4 Indexing Pipeline

There may be many indexing pipelines directing updates to the same updater node. If there are multiple updates to the same document they should be forwarded by the same pipeline.

The indexing pipeline is responsible to refeed incomplete generations after a crash.

An updater node must await generation complete from all indexing pipelines before it can write generation complete to its own log.

6.5 Online Changes to the Index

6.5.1 Add Log File

A log file can be added by just putting it into the list of log files. It should be put into the sequence after the log file currently being written to. Before it is added the log file should have a valid log file header. The file must also be mapped into the memory.

6.5.2 Remove Log File

A log file can be removed when it is the next in the sequence to be written to. First the all checkpoints in the file have to be removed from the checkpoint index. Then the file can be removed from the list of log files and the file unmapped and closed.

If a user wants to remove a specific log file, the user must enqueue it for removal and wait until it becomes the next file. This might take a log time if there are few or no index updates going on.

There should never be less than two log files.

6.5.3 Change Size of Log File

This is done by deleting the log file, resizing it, modifying the header and then adding it.

6.5.4 Change Size of Dictionary

If one chooses to store the dictionary in a B+-tree, it will automatically grow when data is inserted into it. Shrinking it becomes more difficult but may not be necessary.

6.6 Incomplete Disk Writes

The current indexing strategy with multiple generations handles crashes during indexing well. If there is a crash before the index is complete, one just starts over again.

Care has been taken to keep this behaviour with new updateable index of the present invention. The log file enables redoing an operation if it fails. The largest problem is when in-place updating of data on disk is performed. The following scenario might occur.

1. Reading two consecutive sectors from disk.
2. Updating the data and creating a log record that is written to disk.
3. Attempting to write the updated data to the same two sectors as read in step 1.
4. The computer crashes, such that only the first sector is written, not the second.

If there is an advanced storage array step 4 will not happen. But, it might occur on cheaper storage solutions. The problem is that one cannot recreate the new data any more by reading the two sectors and applying the log record since the data is corrupted. The solution is either:

1. Keep enough data in the log record so we do not have to read the original data to reconstruct the new data, or
2. Only append data to the updated area and use some signature fields to see what is complete or not.

For the updateable index the problem arises for a delta list immediately following the occurrence list. It might be updated in-place multiple times.

7 Potential Improvements

7.1 Concurrent Updaters

It might be possible to allow multiple computers to do checkpoints and garbage-collection concurrently on the same index structure by partitioning the words (range partitioning will probably be best). The start and stop of a checkpoint, the allocation of space at the head of the occurrence file and update of the dictionary must be coordinated. The log file can be partitioned.

7.2 Stop Words and Phrase Search Support

Occurrence lists for stop words will be very large and will be expensive to read from disk, run matching against and update. Most often stop words are only valuable for phrase searches. A posocc file supports phrase searches, but is much more expensive when stop words are present in the query than using a dedicated phrase search file.

It is possible to split the occurrence lists for stop words into smaller occurrence lists. Instead of indexing the stop word alone it is indexed with the following word. E.g. instead of indexing "the" one should index "the camel", "the car" and "the cat" etc.

7.3 Compression

Compression has not been discussed here. Compression should be considered both in the occurrence file (position and delta lists), the dictionary and the log. It might be just as important to compress the data when it is in memory as on disk. Caching it in a compressed form will increase CPU consumption for access to this data but will increase cache hit ratios and reduce disk I/O.

7.4 Multiple Occurrence Files

Multiple occurrence files may be present depending on word size and update frequency. This might make it possible to optimize file system parameters in big storage arrays and garbage collection strategies. Non-collocated delta lists may also be placed in their own occurrence file.

8 Concluding Remarks

The method of the present invention works for index structures of an updateable inverted list index with full position information (posocc). It can also be applied to a boolocc and a phraseocc index without major changes. A similar approach can be used for other index formats.

Altogether, the present invention encompasses a hitherto uncharted territory with regard to indexes and index updating, such that for instance the statistical aspects of document properties may lead to unexpected effects. The method of the invention appears more complex than previous indexing methods and provides for a more complex index structure, and in order to achieve its goal it is important that there is adequate memory for the database log and dictionary. However, the complexity of the inventive method and index and capacity requirements for its implementation on a mass storage device such as a disk memory shall in the long run be considered marginal factors. They are more than outweighed by the manly advantages of the method according to the present invention. An index generated and updated according to the method of the present invention shall always yield a very good freshness and be highly consistent, while having a much lower storage overhead than current indexes. Moreover, there is only one partition and this implies fewer memory accesses during a query term lookup. Furthermore, the present invention supports multithreading during garbage collection and checkpoints, shared file systems (NAS) with one updater and a plurality of searchers. Finally, the dynamic updateable index realized by applying the method of the present invention shall enable long-running searches without stalling indexing and hurting the freshness of the index.

The invention claimed is:

1. A method for dynamic updating of an index of a search engine, comprising:
    storing the index on a mass storage device of a search engine that is implemented on one or more servers, the index being an inverted index, the index comprising a dictionary that maps words to word identifiers, a posting file, and a database log that stores changes to the dictionary as the changes occur, the posting file having posting lists for each keyword of the index;
    generating a position list for a keyword, wherein the position list gives all locations of the keyword in the documents;
    inserting a record in the database log in response to each change made to the dictionary, the record including the keyword, the position list and a reference to a previous record of the same keyword in the database log, said previous entry having a reference stored in the mass storage device as the last added entry of all recently added keywords;
    retrieving a dictionary entry from the dictionary that corresponds to a keyword;
    using data indicated by the dictionary entry to read a given position list and a given delta list from the posting file, the given position list indicating positions of the given keyword, the given delta list containing changes to the given occurrence list;
    merging into a single position list the given position list, updates from the given delta list and given entries in the database log, the given entries in the database log indicating modifications to the given position list; and
    using the single position list for further processing of a search query.

2. The method according to claim 1, further comprising:
    grouping all updates of the database log together at specified intervals moving the grouped updates to the posting file; and
    storing each keyword respectively in an occurrence list in the form of occurrences of the keyword older than a determined update generation and in a delta list in the form of a set of smaller updates more recent than the same update generation, such that the dictionary contains one entry for each keyword in the posting file and a reference to the occurrence list and the delta list.

3. The method according to claim 2, further comprising storing the occurrence list and the delta list in the posting file.

4. The method according to claim 2, wherein the dictionary is implemented as a B-tree.

5. The method according to claim 4, further comprising:
    storing the occurrence list and the delta list in the B-tree when the occurrence list and the delta list are below a specific size.

6. The method according to claim 2, further comprising:
    forcing the database log to the mass storage device at the end of each update generation; and
    recovering the index after a failure or stoppage of the search engine by replaying the database log and recreating the keyword entries in the main memory up to the last update in the database log for each keyword.

7. The method according to claim 2, further comprising:
    organizing the posting file as a circular file;
    reclaiming unused space at a tail of the posting file; and
    moving existing keyword entries to a head of the posting file.

8. The method according to claim 7, further comprising adding a keyword entry to the end of the posting file if no space to move an existing entry or to add a new keyword entry is present.

9. The method according to claim 1, wherein merging of the given position list and the given delta list is performed without including any update generation more recent than a specified generation, such that the search query can be processed for occurrences of the keyword existing at the end of the specific generation.

10. A disk memory storing instructions that when executed perform operations for dynamic updating of an index of a search engine, comprising:
    storing the index on a mass storage device of a search engine that is implemented on one or more servers, the index being an inverted index, the index comprising a dictionary that maps words to word identifiers, a posting file, and a database log that stores changes to the dictionary as the changes occur, the posting file having posting lists for each keyword of the index;
    generating a position list for a keyword, wherein the position list gives all locations of the keyword in the documents;
    inserting a record in the database log in response to each change made to the dictionary, the record including the keyword, the position list and a reference to a previous record of the same keyword in the database log, said previous entry having a reference stored in the mass storage device as the last added entry of all recently added keywords;
    retrieving a dictionary entry from the dictionary that corresponds to a keyword, using data indicated by the dictionary entry to read a given position list and a given delta list from the posting file, the given position list indicating positions of the given keyword, the given delta list containing changes to the given occurrence list,
merging into a single position list the given position list, updates from the given delta list and given entries in the database log, the given entries in the database log indicating modifications to the given position list; and
    using the single position list for further processing of a search query.

11. The disk memory according to claim 10, further comprising:
    grouping updates of the database log together at specified intervals moving the grouped updates to the posting file; and storing each keyword respectively in an occurrence list in the form of occurrences of the keyword older than a determined update generation and in a delta list in the form of a set of smaller updates more recent than the same update generation, such that the dictionary contains one entry for each keyword in the posting file and a reference to the occurrence list and the delta list.

12. The disk memory according to claim 11, wherein the dictionary is implemented as a B-tree and storing the occurrence list and the delta list in the B-tree when the occurrence list and the delta list are below a specific size.

13. The disk memory according to claim 11, further comprising:
    forcing the database log to the mass storage device at the end of each update generation; and recovering the index after a failure or stoppage of the search engine by replaying the database log and recreating the keyword entries in the main memory up to the last update in the database log for each keyword.

14. The disk memory according to claim 11, further comprising:
organizing the posting file as a circular file; reclaiming unused space at a tail of the posting file; and moving existing keyword entries to a head of the posting file.

* * * * *